US012697796B2

(12) United States Patent
Zuliani

(10) Patent No.: US 12,697,796 B2
(45) Date of Patent: Aug. 4, 2026

(54) METHOD FOR MAKING A CLOSURE FOR A CONTAINER

(71) Applicant: SOREMARTEC S.A., Senningerberg (LU)

(72) Inventor: Luca Zuliani, Luxembourg (LU)

(73) Assignee: SOREMARTEC S.A., Senningerberg (LU)

(*) Notice: Subject to any disclaimer, the term of this patent is extended or adjusted under 35 U.S.C. 154(b) by 0 days.

(21) Appl. No.: 18/773,015

(22) Filed: Jul. 15, 2024

(65) Prior Publication Data

US 2025/0026100 A1 Jan. 23, 2025

(30) Foreign Application Priority Data

Jul. 20, 2023 (LU) ....................................... 504 775

(51) Int. Cl.

*B31D 1/00* (2017.01)
*B31B 50/16* (2017.01)

(52) U.S. Cl.

CPC .............. *B31D 1/005* (2013.01); *B31B 50/16* (2017.08)

(58) Field of Classification Search

CPC ..... B31D 1/005; B31B 2120/10; B29C 65/18; B29C 66/112; B29C 66/131; B29C 66/24221; B29C 66/71; B29C 66/849; B29C 66/53461; B29C 66/72328; B29C 66/7422; B29C 2793/0045; B65D 2251/0093; B65D 51/20; B65D 2251/0018; B65D 2543/00092; B65D 2577/205; B65D 2543/00268; B65D 2543/00537; B65D 77/2032; B65D 77/2024; B65D 17/4011; B65D 2543/00509; B65D 2577/2091; B65D 2251/0015

See application file for complete search history.

(56) References Cited

U.S. PATENT DOCUMENTS

| | | | | |
|---|---|---|---|---|
| 3,408,902 | A | 11/1968 | Voe | |
| 2013/0200138 | A1 * | 8/2013 | Sireix | B65D 21/0217 493/379 |
| 2024/0009952 | A1 * | 1/2024 | Cho | B31D 5/02 |

FOREIGN PATENT DOCUMENTS

| | | | |
|---|---|---|---|
| CN | 210679870 | U | 6/2020 |
| EP | 0995693 | B1 | 5/2003 |
| WO | 2023132378 | A1 | 7/2023 |

OTHER PUBLICATIONS

Luxenbourg Search Report with Written Opinion issued for Luxembourgian Patent Application No. LU 504 775 on Feb. 1, 2024, 7 pages.

* cited by examiner

*Primary Examiner* — Veronica Martin

(74) *Attorney, Agent, or Firm* — Rothwell, Figg, Ernst & Manbeck, P.C.

(57) ABSTRACT

Method for making a closure for closing a container, the closure including a closure body made of paper and an inner sealing element attached to the closure body, the method includes the following steps: providing a sheet material including at least a paper layer and a sealing layer; removing an excess portion of the sealing layer from the sheet material so that the remaining portion of the sealing layer forms the inner sealing element in the sheet material; by use of a forming device, forming the sheet material, in which the inner sealing element has been previously formed, to realize the closure body having the inner sealing element attached.

9 Claims, 4 Drawing Sheets

METHOD FOR MAKING A CLOSURE FOR A CONTAINER

CROSS REFERENCE TO RELATED APPLICATION(S)

This application the benefit of Luxembourgian Patent Application No. LU 504 775, filed on Jul. 20, 2023, the disclosures of which is herein incorporated by reference in its entirety.

TECHNICAL FIELD OF THE INVENTION

The present invention relates to a method for making a closure for closing a container and to a closure obtained by the same method.

In particular, the present invention presents a new closure for closing a container, which comprises a closure body made essentially of paper and an inner sealing element attached to the closure body.

The inner sealing element is configured to seal the open mouth of the container and, to this purpose, it can for example be glued or welded to the upper rim of the open mouth of the container so as to close any passage between the inside of the container and the outside.

Preferably, the inner sealing element is configured to remain attached to the upper rim of the container and separate from the closure body, when, in use, the closure body is removed from the container for the first time.

The consumer has then to remove the inner sealing element for acceding to the inside of the container.

Afterwards, to close again the container, the consumer can simply use the closure body alone, deprived of the inner sealing element.

PRIOR ART AND THE OBJECTIVE OF THE INVENTION

Italian patent application no. IT102014902274922 in the name of the same Applicant already discloses a closure that comprises an inner sealing element of the type indicated above; however, in this prior art solution the closure body is made of plastic rather than paper.

Replacing plastic with paper is one of the actions that can be taken in the packaging field for diminishing the environmental impact of packages.

In this perspective, the Applicant has then designed the new closure presented at the beginning, in which the closure body is made essentially of paper and an inner sealing element is attached to it. The sealing element of the new closure may operate the same functions of the sealing element that is disclosed in the IT102014902274922.

In the prior art, there have already been proposed solutions for making a closure from paper.

For example, GB3211960 discloses a flange cap made of paper and provided with a single helical rib or groove formed near the free edge of its flange.

Other solutions of closures or caps made of paper are disclosed in U.S. Pat. Nos. 1,343,732, 1,559,028, 1,422,018, 2,351,318.

However, this prior art provides no teachings on how to integrate a sealing element into a closure made of paper.

In view of this prior art, the Applicant has the main objective of providing a method for making the new closure presented at the beginning.

As a secondary objective, the Applicant aims to provide a method for making a closure, that is simple, efficient and cost-effective.

SUMMARY OF THE INVENTION

The present invention proposes a method for making a closure for closing a container and a closure obtained by the same method.

The present invention relates in a general way to a method according to claim 1.

The present invention also relates to a closure according to claim 9.

The claims form an integral part of the teachings provided here.

BRIEF DESCRIPTION OF THE DRAWINGS AND DETAILED DESCRIPTION OF ONE OR MORE EMBODIMENTS OF THE INVENTION

Further characteristics and advantages of the invention will be apparent from the following description, which refers to the attached drawings provided purely by way of non-limiting example, in which.

Figure 3:
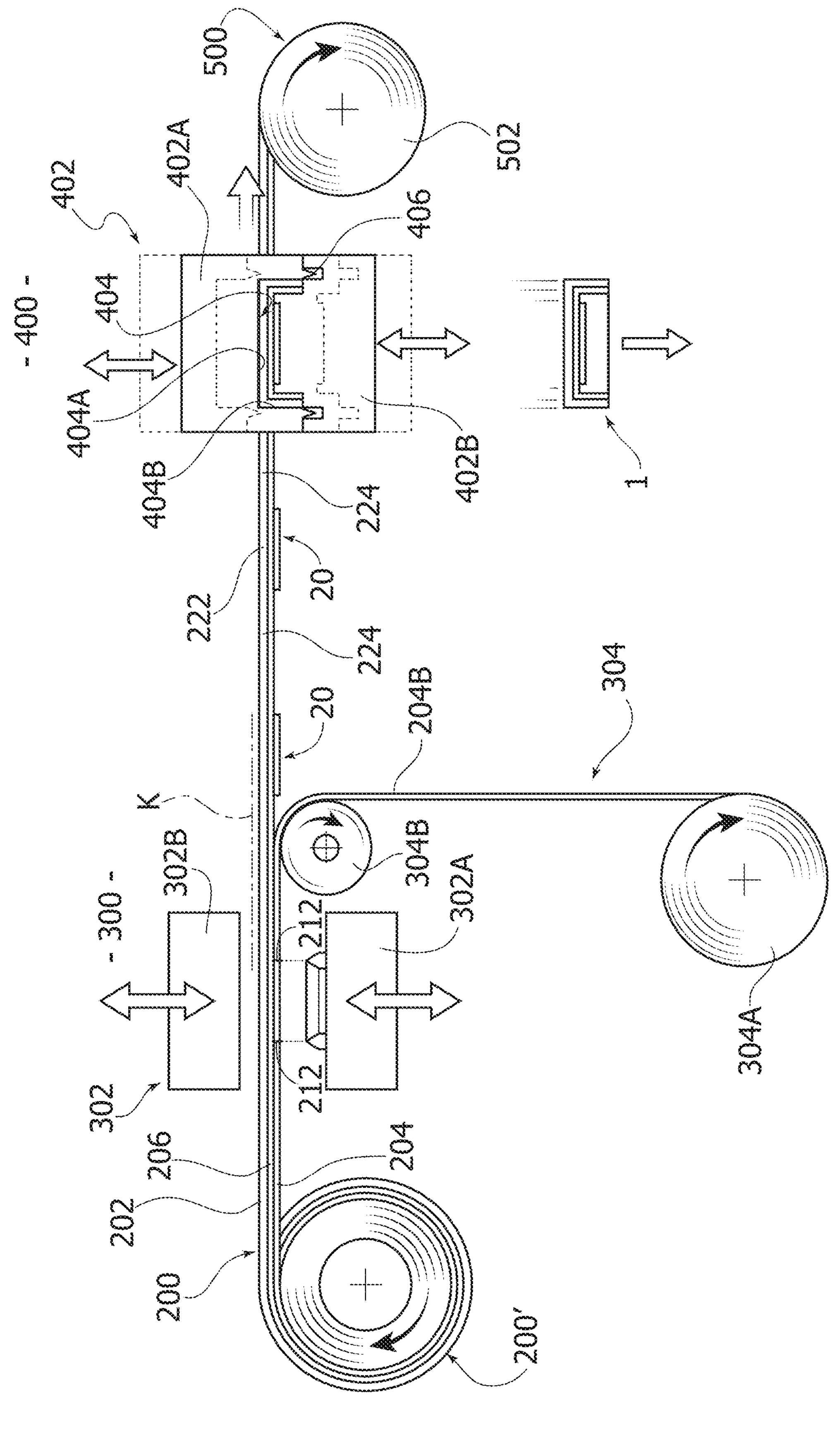
Figure 4:
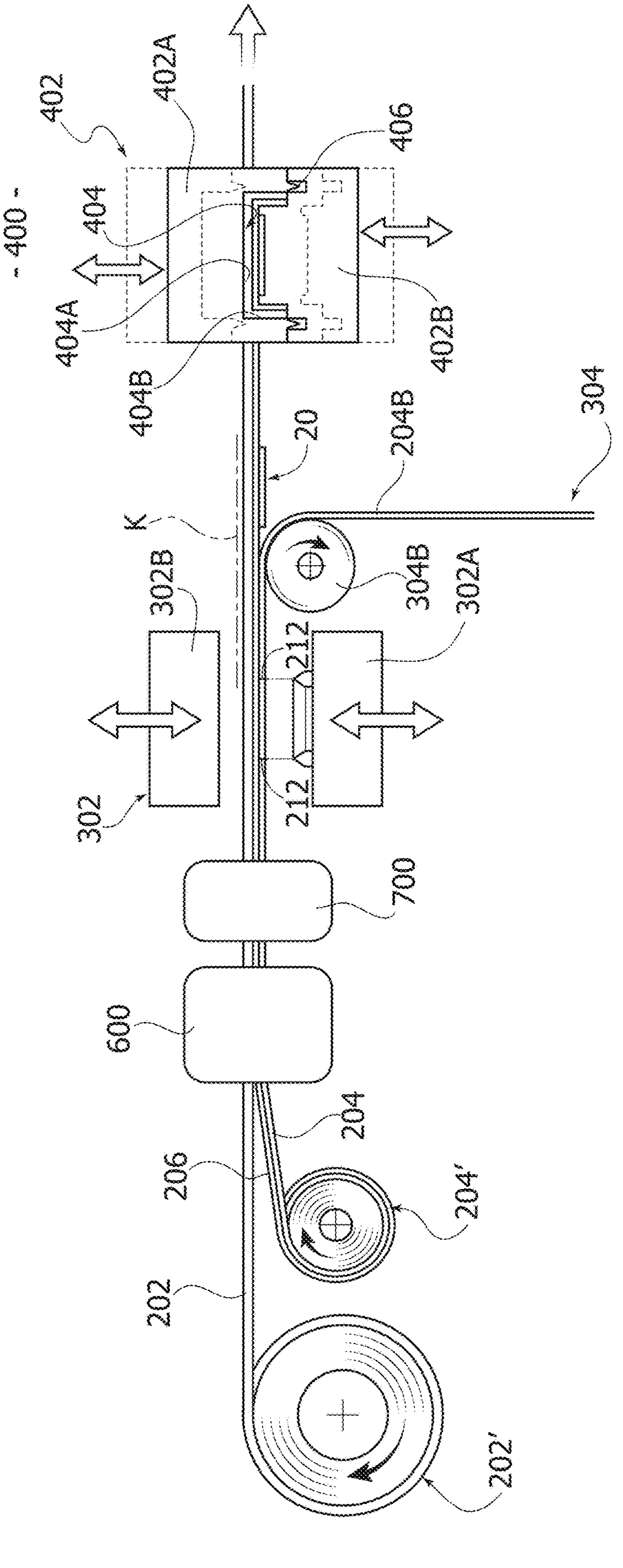

FIG. 3 schematically shows a preferred embodiment of the method described here;

FIG. 4 schematically shows a second preferred embodiment of the method described here.

The following description illustrates various specific details intended to provide a deeper understanding of the embodiments. The embodiments may be realized without one or more of the specific details, or with other methods, components or materials, etc. In other cases, known structures, materials or operations are not shown or described in detail, to avoid obscuring various aspects of the embodiment.

The references used here are purely for convenience and therefore do not define the scope of protection or the extent of the embodiments.

As mentioned above, the present invention relates to a method for making a closure for closing a container and to a closure obtained by the same method.

In particular, the closure here described comprises a closure body made essentially of paper and an inner sealing element attached to the closure body.

Figure 1B:
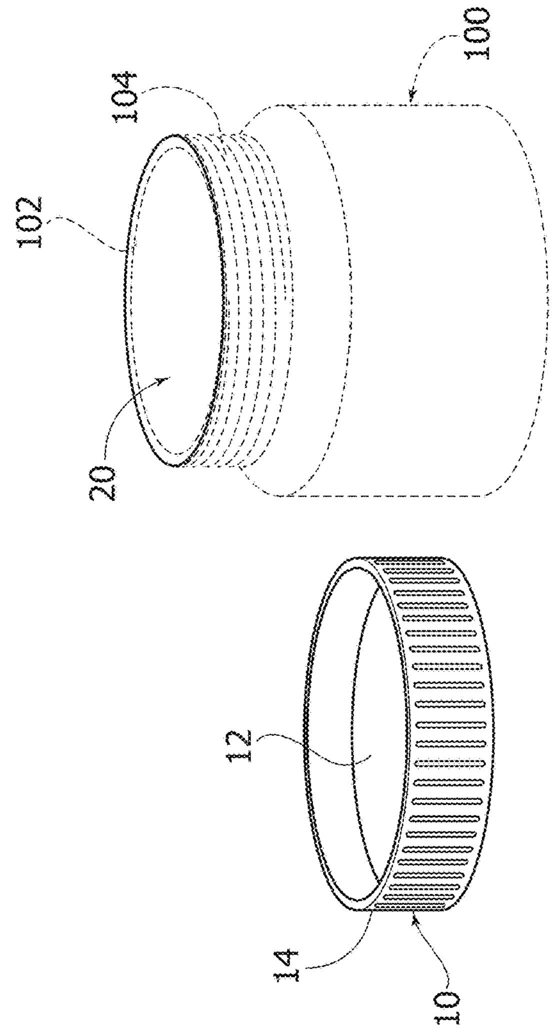
FIGS. 1A and 1B shows an example of closure made according to the method described here.
Figure 1A:
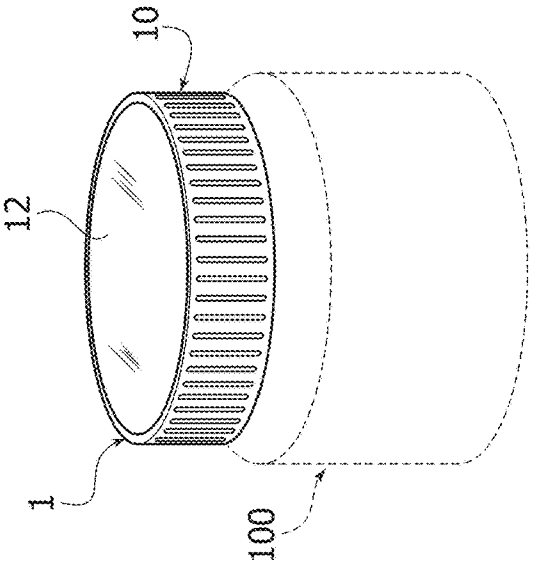
Figure 2:
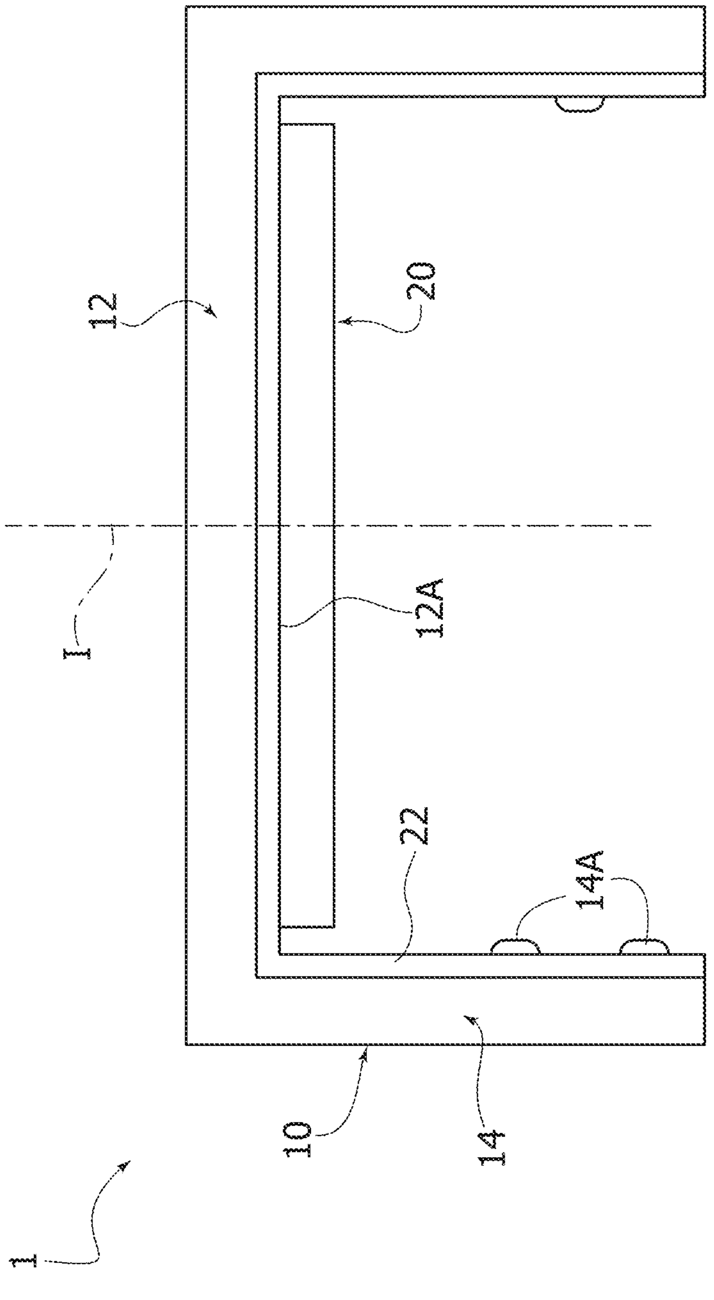
FIG. 2 shows a cross section of the closure of FIG. 1.

Referring to the example of FIGS. 1A and 1B, the closure—which is indicated as a whole by the reference numeral 1—is a closure for closing a container 100 in the form of a jar. The container 100 has an open mouth 102 provided with an external thread 104 for screw-coupling a closure to the container.

Incidentally, it should be noted that the type of container is not to be considered as limitative of the scope of the invention.

For example, the container may also be a bottle, a flask, a glass, etc. and may be made of various materials, e.g. glass, plastic, paper, etc, or any combination thereof.

Besides, instead of the screw-coupling indicated above, the container may be configured for other forms of coupling with a closure, e.g. a snap fitting.

The application of the closure here described is preferably in the food industry; other possible fields can e.g. be the cosmetic and pharmaceutical sectors.

In one or more preferred embodiments, such as the one illustrated, the closure 1 comprises a closure body 10 having a top wall 12 and a lateral wall 14.

The closure body 10 is made essentially of paper. Generally speaking, as it will also emerge in the following, the closure body 100 is indeed made from a sheet material comprising a paper layer; according to the method described here, the paper layer is intended to form the closure body by itself or combined with one or more further layers in a multilayer structure in which, however, paper is contained in a predominant quantity, preferably in a weight percentage higher than 90%. For example, as it will be shown in the following with reference to preferred embodiments of the invention, a separation layer may be attached to the paper layer. In addition or alternatively, the paper layer may also be coated with one or more coating layers having e.g. barrier properties.

Incidentally, it is noted that the term "paper" is here to be intended in a general way to include any sheet material produced by mechanically and/or chemically processing cellulose fibres.

Preferably, the lateral wall 14 extends along a closed path around a reference axis I transversal to the top wall 12.

The top wall 12 is preferably flat and orthogonal to the reference axis I.

In alternative embodiments, the top wall 12 may even be concave or convex at least in one of its regions.

The lateral wall 14 is configured to fit with the open mouth 102 of the container 100.

In one or more preferred embodiments, such as the one illustrated, the lateral wall 14 delimits an internal cavity 14B configured to receive the open mouth 102 of the container 100.

In one or more preferred embodiments, such as the one illustrated, the lateral wall 14 comprises an internal thread 14A configured to engage the external thread 104 of the upper mouth 102 of the container 100 for realizing a screw-coupling between the closure 1 and the container 100.

The closure 1 also comprises an inner sealing element 20, which is attached to the inner face 12A of the top wall 12 of the closure body 10.

In one or more preferred embodiments, such as the one illustrated, the inner sealing element 20 is in the form of a sheet, e.g. disk-shaped like in the illustrated example, which is configured to close any passage through the open mouth 102 between the inside of the container and the outside.

The sealing element 20 may have the function of providing a hermetic closure of the container, e.g. for product preservation, or, simply, of constituting an anti-tampering device.

Preferably, the inner sealing element 20 is glued or welded to the upper rim 102 of the container 100.

Welding of the sealing element to the upper rim 102 can e.g. be performed by heat-welding or ultrasonic-welding, depending on the material forming the sealing element 20.

As shown in FIG. 1B, the inner sealing element 20 is configured to remain attached to the upper rim 102A of the container 100 and separate from the closure body 10, when the latter is removed from the container 100 for the first time.

To this end, at least the top wall 12 of the closure body 10 is preferably provided with a separation layer 22 which is in direct contact with the inner sealing element 20 and has the function of facilitating the separation of the sealing element 20 from the top wall 12 during the first opening of the container.

The inner sealing element 20 may have different shapes depending on the needs and/or the circumstances of the specific applications; it may also be provided with a tab to facilitate gripping by the user.

The method described here is provided for making the closure 1 above illustrated or, more generally, a closure of a type having a closure body made essentially of paper and an inner sealing element attached to the closure body.

Generally speaking, the method described here comprises the following steps:

- providing a sheet material comprising at least a paper layer and a sealing layer;
- removing an excess portion of the sealing layer from the sheet material so that a portion of the sealing layer remaining in the sheet material forms the inner sealing element;
- by means of a forming device, forming the sheet material, in which the inner sealing element has been previously formed, to realize the closure body having the inner sealing element attached.

In other words, the method described here provides that both the closure body and the sealing element of the closure are realized starting from a same sheet material containing a paper layer and a sealing layer.

This sheet material can be advantageously produced independently from the implementation of the method here in question, e.g. at a separate site.

The paper layer and the sealing layer can be joined together to form the sheet material in question via a lamination process.

Starting from this sheet material, the method first provides that the sealing element of the closure is formed in the sheet material as a result of removing an excess portion of the sealing layer from it.

Successively, the sheet material having the sealing element integrated is formed by means of the forming device to realize the closure body provided with the sealing element at a predetermined position.

As will be described in the following, the sheet material may be in the form of a web wound into a reel.

In this case, the web is made to advance and continuously extend along a working path and at the same time the two above-indicated steps are executed on it in two different stations along the working path.

As a result of this, a continuous succession of finished closures are realized from the web, while this is fed along the working path, according to a production rate function of the velocity of advancement of the web.

Referring now to FIG. 3, this schematically illustrates a first embodiment of the method described here.

In the illustrated embodiment, the sheet material is provided in the form of a web 200 which is unwound from a reel 202 and is advanced along a working path K.

The web 200 includes a paper layer 202 and a sealing layer 204 joined together, e.g. as a result of a lamination process.

Preferably, the web 200 also comprises a separation layer 206 interposed between the two layers 202 and 204.

The sealing layer 204 may comprise at least one of the following materials: aluminium, plastic, paper, or any combination thereof.

The separating layer 206 may comprise a polymer, e.g. a fossil-based and recyclable plastic or a biodegradable polymer such as PHA, PBS, PLA, etc.

In one or more preferred embodiments, the sealing layer is an aluminium foil, preferably having a thickness in the range between 10 and 30 micron, and the separating layer is a polymer layer.

At a station 300, the web 200 is subjected to a step of removing an excess portion of the sealing layer 204 to form the inner sealing layer 20 of the closure 1 directly in the web 200 itself.

In one or more preferred embodiments, such as the one illustrated, this step includes:

by means of a cutting device 302, realizing at least one cut 212 in the sealing layer 204 following a predetermined cutting line, so as to divide the sealing layer 204 into at least one portion defining the inner sealing element 20 and at least one excess portion 204B; and, successively peeling the excess portion 204B from the web 200, while leaving there the inner sealing element 20.

The cutting device 302 may be a mechanical device comprising a reciprocating cutter 302A and a contrast block 302B, which are arranged at the opposite sides of the web 300.

The cutter 302A is configured to reciprocally move transversally (or orthogonally) to the web 200 and to penetrate, as a result of its forward stroke, the web 200 to a depth corresponding to the thickness of the sealing layer 204.

The contrast block 302B may be stationary or movable in a reciprocating manner like the cutter 302A, and has the function of supporting the web 200 to contrast the pressing exerted on the same by the cutter 302A, while this penetrates the web to form the cuts 212.

In an alternative embodiment, the cutting device may be a laser cutting device and include a laser source configured to generate a laser beam able to realize the cut 212 in the web 200.

The laser source may be e.g. a fibre laser or a YAG laser.

On the other hand, the peeling operation is executed by means of a drawing device 304 which is configured to take the excess portion 204B of the sealing layer 204 and draw it away from the web 200.

In one or more preferred embodiments, such as the one illustrated, the excess portion 204B is in the form of a continuous band which can be gradually peeled from the web 200 while the latter advances along the working path K.

In one or more preferred embodiments, the drawing device 304 is a winding device having a rotating roller 304A which is connected to a leading edge of the excess portion band and rotates to wind the excess-portion band on itself, in this way causing peeling of the band 204B from the web 200.

In one or more preferred embodiments, such as the one illustrated, the drawing device may include at least one deviating member 304B, e.g. a freely-rotating roller, which is configured to deviate the excess-portion band 204B of the sealing layer 204 in a direction pointing away from the web 200.

Successively, at a station 400 arranged downstream of the station 300, the web 200 provided with the inner sealing layer 20 and cleared of the excess portion 204B, is subjected to a forming operation by a forming device 402.

The forming operation includes shaping the web 200 so as to realize the closure body 10 of the closure 1 with the paper layer 212 of the web, at the same time arranging the inner sealing element 20, previously formed in the same web 200, at a predetermined position in the finally-formed closure body 10.

In one or more preferred embodiments, such as the one illustrated, the forming device 402 comprises a first and a second forming tool 402A, 402B which are arranged at opposite sides of the web 200 and are configured to move according to a reciprocating motion transversally (or orthogonally) to the web 200, between an open position, in which the two tools 402A, 402B are kept at a distance from the web 200, and a closed position, in which the two tools 402A, 402B are coupled together and press the web 200 from opposite sides constraining it within a forming cavity 404 that is delimited by the same two tools coupled together.

The forming cavity 404 has the same shape of the closure body 10 to be realized and, in particular, includes a first region 404A which is configured to realize the top wall 12 of the closure body 10 and a second region 404B which is configured to realize the lateral wall 14.

Correspondingly, the web 200 has a first portion 222 which is configured to form the top wall 12, and a second portion 224 which configured to form the lateral wall 14; the first portion 222 includes the inner sealing element 20.

In the forming operation, the web 200 constrained within the forming cavity 404 of the two forming tools 402A, 402B, assumes the same shape of the cavity, with its first portion 222 formed to realize the top wall 12 and its second portion 224 formed to realize the lateral wall 14.

In the thus-formed closure body 10, the sealing element 20 of the second portion 224 finally finds itself at the inner face of the top wall 12.

According to an alternative embodiment, the forming operation can include a vacuum forming process in which the web 200 is pushed to lie against the forming surface of a mold as a result of a pressure differential that is established at opposite sides of the forming surface by means of a negative-pressure generating system.

Incidentally, it can be noted that, in the above illustrated embodiments, the closure body 10 is formed by the paper layer 202 and by the separating layer 206. In any case, as already indicated above, the paper layer 202 is in a predominant quantity, preferably in a weight percentage higher than 90%. The technical expert will understand that the paper layer is intended to realize the self-supporting and load-bearing structure of the closure body and determine its mechanical behaviour.

Forming the web 200 may include controlling certain operation parameters, such as humidity, temperature, pressure exerted on the web 200, the duration of the forming step, etc, depending on the specific circumstances and conditions of the various applications, e.g. the type of paper used or the desired features of the closure body to be made (including, inter alia its shape and dimension, its mechanical behaviour, form and surface quality, the expected dimensional tolerances, etc.).

The person skilled in the art will understand that it is possible to determine the above-said operational parameters experimentally.

In one or more preferred embodiments, such as the one illustrated, the method described here then provides that the web 200 is cut to separate the formed closure body 10 from it.

Preferably, this cutting operation is performed by the same forming device 400.

To this purpose, the forming device 400 is provided with a knife 406 carried by the first or the second forming tool 402A, 402B and arranged so that, when the two tools move to their closed position, the knife 406 cuts the web 200 and separates from it the closure body 10 that is formed inside the forming cavity 404.

During execution of the method described here, the web 200 is advanced along the working path K preferably according to a step-movement such that the web is kept stationary when the devices 302 and 402 operate on it, whereas it is moved during the time interval between one operation cycle of the two devices and the next one.

In alternative embodiments, the web may conversely be continuously advanced along the working path K and the devices 302, 402 are then configured to follow the movement of the web 200 and operate on it at the same time.

The means for moving the web 200 can be of any know type suited to the purpose.

In one or more preferred embodiments, such as the one illustrated, the web 200 is moved along the working path K as a result of a drawing action exerted on it by a drawing device 500 which is arranged downstream of the two stations 300 and 400.

Incidentally, it can be noted that the web maintains its continuous extension even after the finished closures 1 are separated via cutting, with the difference that, at this stage, rather than being a complete sheet, the web presents the voids left by the closures 1 that have been separated from it.

In one or more preferred embodiments, such as the one illustrated, the drawing device 500 may be a winding device including a rotating roller 502 which is connected to a leading edge of the web and rotates to wind the web up on itself.

In alternative embodiments, the above-said drawing of the web 200 along the working path K can be executed by the same forming device 402.

To this purpose, according to these embodiments, the forming device 402 is configured to move according to a forward stroke along the working path K, when the two forming tools 402A, 402B are in their closed position and constrain the web 200 within the forming cavity 404, to form the web and move it along the working path K at the same time. The forming device 402 is also configured to move according a backward stroke along the working path K, when the two forming tools 402A, 402B are in their open position, to return to the initial position and start a new forming cycle.

In view of the above, as a result of the web 200 advancing along the working path K and the above-described operations being executed on it at the stations 300 and 400, a continuous succession of finished closures 1 are realized in the web 200 and separated from it.

The operations executed at the stations 300 and 400 can per se be carried out to make, in one operation cycle, a single sealing element 20 and a single closure body 10, or, alternatively, to make a plurality of sealing elements 20 and a plurality of closure bodies 10.

In this second case, the web is configured to provide to each station, a plurality of first and second portions 212, 214 at the same time, and the devices 302, 402 are themselves configured to make a plurality of sealing elements 20 and a plurality of closure bodies 10 in one operation cycle.

For example, the cutting device 302 may have a plurality of cutters 302A for making a plurality of cuts 212 in the sealing layer 204 of the web 200, and the device 402 may have a plurality of first and second tools 402A, 402B for forming a plurality of closure bodies 10.

Referring now to the embodiment of FIG. 4, this is characterized in that the web 200 is produced in real time in an initial step of the method.

In particular, in one or more preferred embodiments, such as the one illustrated (see FIG. 4), the paper layer 202 and the sealing layer 204 are originally provided in the form of separate webs wound into two respective reels 202', 204'.

The two webs 202, 204 are both made to advance along the working path K and are joined together to form the web 200 by means of a lamination process, in a station 600 arranged upstream of the two stations 300 and 400.

In one or more preferred embodiments, the web 204, which is to constitute the sealing layer 204 in the laminated web 200, also includes the separation layer 206 arranged so as to face the paper web 202.

In one or more preferred embodiments, such as the one illustrated (see FIG. 4), before reaching the two stations 300 and 400 the laminated web 200 is cooled at a station 700, arranged downstream of the station 600 and upstream of the two stations 300 and 400, for stabilizing the joint realized by lamination between the two webs 202, 204.

Referring now to the above-described embodiments, it can be noted how the method described here is able to advantageously exploit the properties of the separation layer 206 of the web 200, which is interposed between the paper layer 202 and the sealing layer 204.

In fact, this layer executes a double function: during the implementation of the method, it facilitates peeling of the excess portion 204B of the sealing layer from the web 200, whilst, in the finished closure 1, under the form of the single divided layer 22, it facilitates the separation of the scaling layer 20 from the closure body 10 during the first opening of the container.

Clearly, provided that the principle of the invention is retained, the details of construction and forms of embodiment can be varied, even to a significant degree, from what has been illustrated herein purely by way of non-limiting example, without thereby departing from the scope of the invention, as defined in the attached claims.

The invention claimed is:

1. Method for making a closure for closing a container, said closure comprising a closure body and an inner sealing element attached to the closure body, the method comprising:

providing a sheet material comprising at least a paper layer and a sealing layer joined together by a lamination process;

removing an excess portion of only the sealing layer from the sheet material, without cutting the paper layer, so that a remaining portion of the sealing layer forms the inner sealing element in the sheet material;

by means of a forming device, forming the sheet material, in which the inner sealing element has been previously formed, to form the closure body having the inner sealing element attached.

2. The method according to claim 1, wherein the closure body has a top wall and a lateral wall, and the inner sealing element is attached to an inner face of the top wall, and wherein:

providing the sheet material includes providing the sheet material with at least one first portion for forming the top wall of the closure body and at least one second portion for forming the lateral wall of the closure body;

removing the excess portion of the sealing layer is executed on the at least one first portion of the sheet material, and forming the sheet material includes forming the at least one first portion of the sheet material to form the top wall of the closure body, forming the at least one second portion of the sheet material to form the lateral wall of the closure body, and arranging the sealing element previously formed in the sheet material at the inner face of the top wall of the closure body.

3. The method according to claim 1, wherein removing the excess portion of only the sealing layer includes:

cutting the sheet material to form at least one cut in only the sealing layer that divides the sealing layer into the inner sealing element and the excess portion, and peeling the excess portion of the sealing layer from the sheet material, while leaving there the inner sealing element.

4. The method according to claim 3, wherein:

providing the sheet material includes providing the sheet material having a separation layer arranged between the paper layer and the sealing layer; and peeling includes peeling the excess portion of the sealing layer from the separation layer of the sheet material.

5. The method according to claim 1, wherein;

providing the sheet material includes providing a web of sheet material advancing and continuously extending along a working path;

in a first station along the working path, removing the excess portion of the sealing layer from the web to form therein a succession of inner sealing elements along the working path;

in a second station along the working path, downstream of the first station, by means of the forming device, forming a succession of closure bodies each having attached a respective one of the succession of inner sealing elements previously formed in the web; and separating by cutting each formed closure body from the web.

6. The method according to claim 5, wherein removing the excess portion of only the sealing layer includes:

cutting the web to form a succession of cuts in only the sealing layer along the working path that divide the sealing layer into the succession of inner sealing elements and an excess-portion band of the sealing layer, and peeling the excess-portion band from the sheet material, while leaving there the succession of inner sealing elements joined to the paper layer.

7. The method according to claim 1, wherein the sealing layer comprises at least one of: aluminum, plastic, paper, or any combination thereof.

8. The method according to claim 4, wherein the separation layer comprises a polymer, including a fossil-based and recyclable plastic or a biodegradable polymer comprising PHA, PBS, or PLA.

9. A closure for closing the container, wherein the closure is made by the method according to claim 1.

* * * * *